(12) United States Patent
Nguyen

(10) Patent No.: US 9,879,503 B2
(45) Date of Patent: Jan. 30, 2018

(54) METHODS OF TREATING LONG-INTERVAL AND HIGH-CONTRAST PERMEABILITY SUBTERRANEAN FORMATIONS WITH DIVERTING FLUIDS

(71) Applicant: Halliburton Energy Services, Inc., Houston, TX (US)

(72) Inventor: Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 710 days.

(21) Appl. No.: 13/622,395

(22) Filed: Sep. 19, 2012

(65) Prior Publication Data

US 2014/0076570 A1    Mar. 20, 2014

(51) Int. Cl.
| | |
|---|---|
| *C09K 8/72* | (2006.01) |
| *E21B 33/138* | (2006.01) |
| *E21B 43/26* | (2006.01) |
| *C09K 8/512* | (2006.01) |
| *C09K 8/68* | (2006.01) |

(52) U.S. Cl.
CPC ............ *E21B 33/138* (2013.01); *C09K 8/512* (2013.01); *C09K 8/685* (2013.01); *E21B 43/261* (2013.01)

(58) Field of Classification Search
CPC .......... C09K 8/702; E21B 43/26; E21B 43/14
See application file for complete search history.

(56) References Cited

U.S. PATENT DOCUMENTS

| | | | |
|---|---|---|---|
| 3,612,179 A | 10/1971 | Anderson et al. | |
| 3,937,283 A | 2/1976 | Blauer et al. | |
| 4,044,833 A | 8/1977 | Volz | |
| 4,267,887 A * | 5/1981 | Watanabe | 166/300 |
| 4,982,793 A | 1/1991 | Holtmyer et al. | |
| 5,067,565 A | 11/1991 | Holtmyer et al. | |
| 5,122,549 A | 6/1992 | Holtmyer et al. | |
| 5,890,536 A * | 4/1999 | Nierode | E21B 43/006 166/284 |
| 6,860,328 B2 * | 3/2005 | Gonzalez | C09K 8/665 166/280.1 |
| 2005/0020454 A1 | 1/2005 | Francini et al. | |
| 2006/0000609 A1 * | 1/2006 | Cavazzoli | C09K 8/74 166/280.1 |
| 2006/0113077 A1 * | 6/2006 | Willberg et al. | 166/280.1 |
| 2007/0277981 A1 | 12/2007 | Robb et al. | |
| 2008/0026955 A1 | 1/2008 | Munoz, Jr. et al. | |
| 2008/0121398 A1 | 5/2008 | Cawiezel et al. | |
| 2010/0032160 A1 | 2/2010 | Wilson et al. | |
| 2010/0263866 A1 * | 10/2010 | Huang | C09K 8/506 166/282 |
| 2011/0168395 A1 | 7/2011 | Welton et al. | |
| 2011/0240297 A1 | 10/2011 | Lord et al. | |
| 2011/0265994 A1 * | 11/2011 | Entchev | C09K 8/508 166/270 |

OTHER PUBLICATIONS

Polysciences, Inc. PolyFacts: Monomers & Polymers.*

* cited by examiner

*Primary Examiner* — Doug Hutton, Jr.
*Assistant Examiner* — Avi Skaist
(74) *Attorney, Agent, or Firm* — McDermott Will & Emery LLP

(57) ABSTRACT

Methods of treating a portion of a subterranean formation, including providing a treatment fluid comprising an aqueous base fluid, a treating agent, a foaming agent, a gas source, and a self-degradable diverting agent; placing the treatment fluid into the portion of the subterranean formation; and degrading the self-degradable diverting agent within the subterranean formation.

13 Claims, No Drawings

METHODS OF TREATING LONG-INTERVAL AND HIGH-CONTRAST PERMEABILITY SUBTERRANEAN FORMATIONS WITH DIVERTING FLUIDS

BACKGROUND

The present invention relates to methods of treating long-interval and high-contrast permeability subterranean formations with diverting fluids.

Subterranean wells (such as hydrocarbon producing wells, water producing wells, and injection wells) are often stimulated by hydraulic fracturing treatments. In hydraulic fracturing treatments, a viscous fracturing fluid, which may also function as a carrier fluid, is pumped into a portion of a subterranean formation at a rate and pressure such that the subterranean formation breaks down and one or more fractures are formed. Typically, particulate solids, such as graded sand, are suspended in a portion of the fracturing fluid and then deposited in the fractures. These particulate solids, or "proppant particulates," serve to prevent the fractures from fully closing once the hydraulic pressure is removed. By keeping the fracture from fully closing, the proppant particulates aid in forming conductive paths through which fluids may flow.

Achieving adequate fracture penetration, and thus adequate hydrocarbon production, in a subterranean formation often requires the use of diverting agents. The purpose of the diverting agents is to prevent substantial loss of the liquid portion of treatment fluids into an undesired portion of a subterranean formation. Diverting agents are intended to divert treatment fluids from a high permeability zone in a subterranean formation to a lower permeability zone to prevent the buildup of solid material or filter cake that may form on the high permeability zones. Such buildup may result in stuck pipe, decreased hydrocarbon production, and other drilling and fracturing problems. Diverting agents may be used prior to, during, or after fracturing a subterranean formation. The effectiveness of a diverting agent depends on a number of factors, including temperature, wellbore length, and permeability of the subterranean formation.

Traditional diverting agents may be less effective when used to treat long-interval and/or high-contrast permeability formations. In long-interval formations, traditional diverting agents may be exhausted prior to reaching target portions of the formation. Long-interval formations are additionally more likely to having high-contrast permeability portions. In high-contrast permeability formations, low permeability and high permeability portions of the formation are adjacent to or in fluid communication with one another. Traditional diverting agents are designed to target these high permeability zones, diverting treatment fluids to allow for uniform injection and/or penetration of a treatment fluid over the entire interval length. A need, therefore, for more effective diverting agents over long-interval formations and high-contrast permeability formations may be of value to one of ordinary skill in the art.

SUMMARY OF THE INVENTION

The present invention relates to methods of treating long-interval and high-contrast permeability subterranean formations with diverting fluids.

In some embodiments, the present invention provides a method of treating a portion of a subterranean formation comprising: providing a treatment fluid comprising an aqueous base fluid, a treating agent, a foaming agent, a gas source, and a self-degradable diverting agent; placing the treatment fluid into the portion of the subterranean formation; and degrading the self-degradable diverting agent within the subterranean formation.

In other embodiments, the present invention provides a method of treating a portion of a subterranean formation comprising: providing a first treatment fluid comprising: a first aqueous base fluid, a first foaming agent, a first gas source, and a first self-degradable diverting agent; providing a second treatment fluid comprising a second aqueous base fluid, proppant particulates, a second foaming agent, a second gas source, and a second self-degradable diverting agent; introducing the first treatment fluid into the portion of the subterranean formation at a rate sufficient to create or enhance at least one fracture therein; introducing the second treatment fluid into the portion of the subterranean formation at a rate sufficient to propagate the at least one fracture and place the proppant particulates therein; and degrading the first self-degradable diverting agent and the second self-degradable diverting agent within the subterranean formation.

The features and advantages of the present invention will be readily apparent to those skilled in the art upon a reading of the description of the preferred embodiments that follows.

DETAILED DESCRIPTION

The present invention relates to methods of treating long-interval and high-contrast permeability subterranean formations with diverting fluids.

As used herein, the term "long-interval" refers to wellbores in subterranean formations of about 30 feet or more. Long-interval formations may be horizontal, vertical, deviated, nonlinear, or any other wellbore shape suitable for use in the present invention. As used herein, the term "high-contrast permeability" refers to portions of a subterranean formation in which a low permeability zone abuts, is adjacent to, or is otherwise in fluid communication with a high permeability zone. In hard-rock formations, high permeability zones typically are greater than about 10 millidarcy ("mD") and low permeability zones typically less than about 10 mD. In soft-rock formations, high permeability zones are typically greater than about 100 mD and low permeability zones are typically less than about 50 mD.

The methods of the present invention disclose a synergistic combination of diverting capabilities of foams and diverting capabilities of self-degradable diverting agents. Self-degradable diverting agents generally have physical structures or particle sizes with sufficient robustness to withstand high differential pressures better than foam alone. The self-degradable diverting agents interact with the foaming agents of the present invention to strengthen the longevity of the foamed treatment fluids. Foamed treatment fluids can lose their foamed quality when exposed to conditions present in subterranean formations, including subterranean temperatures, chemistry, salinity, acidity, and oil. The self-degradable diverting agents work synergistically with the foaming agents to delay or prevent collapse of the foamed treatment fluids, such that the diverting capabilities of the treatment fluids are enhanced. Deposition of self-degradable diverting agents in low permeability zones of high-contrast permeability formations additionally allows later degradation of the self-degradable diverting agents such that treatment fluids can access those potentially oil-rich reservoirs, unlike traditional diverting fluids. Also, if the foaming agent does collapse, the self-degradable diverting agents continue to provide the desired diverting capabilities.

The self-degradable diverting agents may be designed to degrade as a function of time and/or pH.

In some embodiments, the present invention provides a method of treating a portion of a subterranean formation comprising: providing a treatment fluid comprising an aqueous base fluid, a treating agent, a foaming agent, a gas source, and a self-degradable diverting agent; placing the treatment fluid into the portion of the subterranean formation; and degrading the self-degradable diverting agent.

The treatment fluids of the present invention may be injected into a subterranean formation as part of a stimulation operation, such as hydraulic fracturing, acidizing, or a remedial chemical treatment such as scale inhibition treatment, gas hydrate treatment, or resin consolidation treatment. As used herein, the term "treatment fluid" may generally refer to any subterranean fluid used for subterranean operations. The treatment fluids of the present invention may also be used to create, enhance, or propagate at least one fracture in a subterranean formation. In some embodiments, the treatment fluids of the present invention comprise an aqueous base fluid, a treating agent, a foaming agent, a gas source, and self-degradable diverting agents. In other embodiments, the treatment fluid further comprises proppant particulates.

In hydraulic fracturing operations, various equipment (e.g., fracturing pumps, monitoring units, fracturing tanks, etc.) may be used to inject treatment fluids at rates sufficient to create, enhance, or propagate fractures in subterranean formations. While at least one embodiment described herein relates to the use of treatment fluids to induce fractures in a subterranean formation, a person of ordinary skill in the art will appreciate that the fluids of the present invention may be used in non-fracturing operations. For example, the treatment fluids of the present invention may be used for remedial treatments (e.g. wellbore cleanout) of propped fractures, particularly those having a long perforated interval or a long interval containing multiple fractures.

I. Aqueous Base Fluid

Aqueous base fluids suitable for use in the present invention may comprise fresh water, saltwater (e.g., water containing one or more salts dissolved therein), brine (e.g., saturated salt water), seawater, produced water, flow back water, aqueous acid solutions, aqueous scale inhibitor solutions, aqueous water blocking solutions, aqueous clay stabilizer solutions, aqueous water blocking solutions, aqueous clay stabilizer solution, aqueous chelating solutions, aqueous surfactant solutions, aqueous paraffin removal solutions, or any combinations thereof. Generally, the aqueous base fluid may be from any source, provided that it does not contain components that might adversely affect the stability and/or performance of the treatment fluids of the present invention. Because the relatively simple chemistries and high tolerances for salt and temperature of the treatment fluids of the present invention, the aqueous base fluids may be from contaminated water sources (e.g., produced water, flow back water), which may be advantageous.

In certain embodiments, the pH of the aqueous base fluid may be adjusted (e.g., by a buffer or other pH adjusting agent). In these embodiments, the pH may be adjusted to a specific level, which may depend on, among other factors, the types of additives included in the treatment fluid. Additives suitable for use in the present invention may include, but are not limited to, viscosifying agents, buffering agents, pH adjusting agents, biocides, bactericides, friction reducers, solubilizer, or any combinations thereof. One of ordinary skill in the art, with the benefit of this disclosure, will recognize when such pH adjustments are appropriate.

II. Treating Agents

The treating agents used in the present invention may serve a variety of purposes. They may interact with proppant particulates, formation fines, or other particulates within the subterranean formation to enhance hydrocarbon production. They may also interact with naturally occurring chemical reactions that take place in the subterranean formation, such as corrosion or scale formation. Treating agents suitable for use in the present invention include, but are not limited to, acids, chelating agents, clay or fines stabilizing agents, tackifying agents and their emulsions, and any combinations thereof. Any treating agents suitable for use in subterranean treatment fluids may be used in the present invention, and will depend on a number of factors, such as subterranean formation temperature, permeability, and wellbore depth. One of ordinary skill in the art, with the benefit of this disclosure, will recognize the particular treating agents appropriate for a specific application.

III. Foaming Agent

In some embodiments of the present invention, foaming agents are used in conjunction with the treatment fluid in order to produce foam. As used herein, the term "foam" refers to a two-phase composition having a continuous liquid phase and a discontinuous gas phase.

Suitable foaming agents for use in conjunction with the present invention may include, but are not limited to, cationic foaming agents, anionic foaming agents, amphoteric foaming agents, nonionic foaming agents, or any combinations thereof. Nonlimiting examples of suitable foaming agents may include, but are not limited to, surfactants like betaines, sulfated or sulfonated alkoxylates, alkyl quarternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivatives thereof, or any combinations thereof. Foaming agents may be included in foamed treatment fluids at concentrations ranging typically from about 0.01% to about 5% of the liquid component by weight (e.g., from about 0.1 to about 50 gallons per 1000 gallons of liquid).

IV. Gas Source

To create or enhance the formation of foam, a source of gas is used in some embodiments of the present invention in conjunction with the foaming agent. Suitable gasses for use in the present invention may include, but are not limited to, nitrogen, carbon dioxide, air, methane, helium, argon, and any combinations thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, in some embodiments, the higher density may impart greater proppant particulate transport capability, up to about 12 lb of proppant per gal of fracture fluid.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%. The term foam as used herein refers to a mixture of gas and liquid wherein the liquid phase is the continuous phase with a discontinuous gas phase therein. Generally, when the gas volume of a gas/liquid foam exceeds 95% the mixture is considered a mist rather than a foam. A mist is a mixture of gas and liquid wherein the gas phase is the continuous phase with a discontinuous liquid phase therein.

V. Self-Degradable Diverting Agent

The treatment fluids of the present invention may further comprise self-degradable diverting agents. Diverting agents are used to seal off a portion of the subterranean formation. By way of example, in order to divert a treatment fluid from a highly permeable portion of a formation to a less permeable portion, a volume of treatment fluid may be pumped into the formation followed by a diverting material to seal off a portion of the formation where the first treatment fluid penetrated. When being placed, the treatment fluid containing the diverting agent will flow most readily into the portion of the formation having the largest pores, fissures, or vugs until that portion is bridged and sealed, thus diverting the remaining fluid to the next most permeable portion of the formation. Diverting agents may not be as effective in long-interval formations having a multitude of portions having large pores, fissures, or vugs. Moreover, diverting agents may not be as effective in formations having high-contrast permeability formations, where substantial hydrocarbon reserves may reside in the low permeability portions adjacent to high permeability formations, the same portions targeting by diverting agents. The treatment fluids of the present invention not only provide for an improved diverting fluid, but also allow access to low permeability zones in high-contrast permeability formations by utilizing a self-degradable diverting agent.

The self-degradable diverting agents of the present invention may include, but are not limited to, a hydrolytically degradable material, a degradable crosslinked gel material prepared from a low molecular weight, crosslinkable polymer and a crosslinking agent, a degradable crosslinked gel material prepared from a reaction of a gelling agent and a stimuli-degradable crosslinking agent comprising at least one degradable group and two unsaturated terminal groups, or combinations thereof. In certain embodiments, the self-degradable diverting agents may be present in an amount from about 0.01% to about 3% by weight of the treatment fluid, preferably from about 0.2% to about 0.7% by weight of the treatment fluid. In certain embodiments, the self-degradable diverting agents may range in size from about 1 to about 1000 μm, preferably from about 50 μm to about 250 μm. The concentration and size of the self-degradable diverting agents for use in the treatment fluids of the present invention may depend on, for example, formation permeability, pore throat size of the formation reservoir, fluid loss rate, differential pressure, and formation temperature.

A. Hydrolytically Degradable Material

The self-degradable diverting agents of the present invention may be selected from a hydrolytically degradable material including, but not limited to, a benzoate ester; a phthalate ester; a lactide; a lactone; a glycolide; a lactam; a polysaccharide; a dextran; a cellulose; a chitin; a chitosan; a protein; an aliphatic polyester; a poly(lactide); a poly(glycolide); a poly(ε-caprolactone); a poly(hydroxybutyrate); a polyanhydride; an aliphatic polycarbonate; a poly(orthoester); a poly(amide); a poly(urethane); a poly(hydroxyl ester ether); a poly(amino acid); a poly(ethylene oxide); a polyphosphazene; an oligomeric lactic acid; a polyethylene glycol; a polyethylene oxide; a citrate ester; a glucose monoester; a partially fatty acid ester; a PEG monolaurate; a triacetin; a glycerine-1-benzoate-2.3-dilaurate; a glycerin-2-benzoate-1,3-dilaurate; a starch; a bis(butyl diethylene glycol)adipate; an ethylphthalylethyl glycolate; a glycerine diacetate monocaprylate; a diacetyl monoacyl glycol; a polypropylene glycol; a poly(propylene glycol)dibenzoate; a dipropylene glycol dibenzoate; a glycerol; an ethyl phthalyl ethyl glycolate; a poly(ethylene adipate)distearate; a di-isobutyl adipate, any derivatives thereof, or any combinations thereof.

B. Degradable Crosslinked Gel Material

The self-degradable diverting agents of the present invention may be comprised of degradable crosslinked gel material. In one embodiment of the present invention, the degradable crosslinked gel material may be prepared by reacting a low molecular weight, depolymerized, crosslinkable polymer with a crosslinking agent, wherein the low molecular weight, depolymerized, crosslinkable polymer is selected from the group consisting of: a guar gum, a modified guar gum, a hydroxypropyl guar; a carboxymethylhydroxypropyl guar; a modified cellulose; a polyacrylate; a modified polyacrylate; a polymethacrylate; a modified polymethacrylate; a polyacrylamide; a modified polyacrylamide; a polyvinyl alcohol; a modified polyvinyl alcohol; a polyvinylpyrrolidone; a modified polyvinylpyrrolidone; derivatives thereof; or combinations thereof, and wherein the crosslinking agent comprises at least one metal ion selected from the group consisting of: boron; zirconium; titanium; aluminum; antimony; chromium; iron; copper; zinc; any derivatives thereof; or any combinations thereof.

Suitable crosslinking agents may be present in the treatment fluids useful in the methods of the present invention in an amount sufficient to provide the desired degree of crosslinking between molecules of the low molecular weight, depolymerized, crosslinkable polymer. In certain embodiments, the crosslinking agent may be present in the first treatment fluids and/or second treatment fluids of the present invention in an amount in the range of from about 0.005% to about 1% by weight of the treatment fluid. In certain embodiments, the crosslinking agent may be present in the treatment fluids of the present invention in an amount in the range of from about 0.05% to about 1% by weight of the first treatment fluid and/or second treatment fluid. One of ordinary skill in the art, with the benefit of this disclosure, will recognize the appropriate amount of crosslinking agent to include in a treatment fluid of the present invention based on, among other things, the temperature conditions of a particular application, the type of gelling agents used, the molecular weight of the gelling agents, the desired degree of viscosification, and/or the pH of the treatment fluid.

In another embodiment of the present invention, the degradable crosslinked gel material may be prepared by reacting a gelling agent and a stimuli-degradable crosslinking agent comprising at least one degradable group and two unsaturated terminal groups, wherein the degradable group is selected from the group consisting of: an ester; a phosphate ester; an amide; an acetal; a ketal; an orthoester; a carbonate; an anhydride; a silyl ether; an alkene oxide; an ether; an imine; an ether ester; an ester amide; an ester urethane; a carbonate urethane; an amino acid; derivatives thereof; or combinations thereof, and wherein at least one of the two unsaturated terminal groups is selected from the group consisting of: an unsubstituted ethylenically unsaturated group; a substituted ethylenically unsaturated group; a vinyl group; an allyl group; an acryl group; an unsaturated ester; an acrylate; a methacrylate; a butyl acrylate; an amide; an acrylamide; an ether; a vinyl ether; any derivatives thereof; or any combinations thereof. In certain embodiments, the stimuli-degradable crosslinking agent may be present in the first treatment fluids and/or second treatment fluids of the present invention in an amount in the range of from about 0.005% to about 1% by weight of the treatment fluid. In certain embodiments, the stimuli-degradable crosslinking agent may be present in the treatment fluids of the present invention in an amount in the range of from about 0.05% to about 1% by weight of the first treatment fluid and/or second treatment fluid. The concentration of the stimuli-crosslinking agents for use in the treatment fluids of the present invention may depend on, for example, formation permeability, pore throat size of the formation reservoir, fluid loss rate, differential pressure, and formation temperature.

The gelling agents suitable for use in the present invention may comprise any substance (e.g., a polymeric material) capable of increasing the viscosity of the treatment fluid. In certain embodiments, the gelling agent may comprise one or more polymers that have at least two molecules that are capable of forming a crosslink in a crosslinking reaction in the presence of a crosslinking agent. The gelling agents may be naturally-occurring gelling agents, synthetic gelling agents, or any combinations thereof. The gelling agents also may be cationic gelling agents, anionic gelling agents, or a combination thereof. Suitable gelling agents include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, or combinations thereof. In certain embodiments, the gelling agents comprise an organic carboxylated polymer, such as CMHPG.

Suitable synthetic polymers include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride; acrylamide; acrylamido- and methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride, methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivatives thereof; and any combinations thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer, such as those disclosed in U.S. Pat. Nos. 4,982,793; 5,067,565; and 5,122,549, the entire disclosures of which are incorporated herein by reference.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids useful in the methods of the present invention in an amount sufficient to provide the desired viscosity. In some embodiments, the gelling agents (i.e., the polymeric material) may be present in an amount in the range of from about 0.1% to about 10% by weight of the first treatment fluid and/or second treatment fluid. In certain embodiments, the gelling agents may be present in an amount in the range of from about 0.15% to about 2.5% by weight of the first treatment fluid and/or second treatment fluid.

VI. Proppant Particulates

In some embodiments, the present invention provides for a method of treating a portion of a subterranean formation comprising providing a first treatment fluid comprising an aqueous base fluid, a foaming agent, a gas source, and a self-degradable diverting agent; providing a second treatment fluid comprising an aqueous base fluid, proppant particulates, a foaming agent, a gas source, and a self-degradable diverting agent; introducing the first treatment fluid into the portion of the subterranean formation at a rate sufficient to create or enhance at least one fracture therein; introducing the second treatment fluid into the portion of the subterranean formation at a rate sufficient to propagate the at least one fracture and place the proppant particulates therein; and allowing the self-degradable diverting agent of the first treatment fluid and the second treatment fluid to degrade.

Proppant particulates suitable for use in the present invention may comprise any material suitable for use in subterranean operations. Suitable materials include, but are not limited to, sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials include silica; alumina; fumed carbon; carbon black; graphite; mica; titanium dioxide; meta-silicate; calcium silicate; kaolin; talc; zirconia; boron; fly ash; hollow glass microspheres; solid glass; and combinations thereof. The mean proppant size generally may range from about 2 mesh to about 400 mesh on the U.S. Sieve Series; however, in certain circumstances, other mean proppant sizes may be desired and will be entirely suitable for practice of the present invention. In particular embodiments, preferred mean proppant size distribution ranges are one or more of 6/12, 8/16, 12/20, 16/30, 20/40, 30/50, 40/60, 40/70, or 50/70 mesh. It should be understood that the term "proppant," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention. In certain embodiments, the proppants may be present in the fracturing fluids of the present invention in an amount in the range of from about 0.1 pounds per gallon ("ppg") to about 30 ppg by volume of the fracturing fluid, preferably from about 0.5 ppg to about 15 ppg, and more preferably from about 1.0 ppg to 10 ppg.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The invention claimed is:

1. A method of treating a portion of a subterranean formation comprising:
    providing a treatment fluid comprising an aqueous base fluid, a treating agent, a foaming agent, a gas source, and a first self-degradable diverting agent,
    wherein the foaming agent is present from about 0.01% to about 5.0% of a liquid component of the treatment fluid by weight,
    wherein foam quality of the treatment fluid is from about 85% to about 95%,
    wherein the first self-degradable diverting agent is present from about 0.01% to 3% by weight of the treatment fluid,
    wherein the first self-degradable diverting agent is sized in the range of from about 1 µm to about 1000 µm, and
    wherein the first self-degradable diverting agent is a hydrolytically degradable material selected from the group consisting of a polyethylene glycol; a citrate ester; a glucose monoester; a partially fatty acid ester; a PEG monolaurate; a triacetin; a glycerine-1-benzoate-2,3-dilaurate; a glycerin-2-benzoate-1,3-dilaurate; a bis(butyl diethylene glycol)adipate; an ethylphthalylethyl glycolate; a glycerine diacetate monocaprylate; a diacetyl monoacyl glycol; a polypropylene glycol; a poly(propylene glycol)dibenzoate; a dipropylene glycol dibenzoate; a glycerol; an ethyl phthalyl ethyl glycolate; a poly(ethylene adipate)distearate; a di-isobutyl adipate; any derivatives thereof; and any combinations thereof;
    placing the treatment fluid into the portion of the subterranean formation,
    wherein the portion of the subterranean formation is a long-interval of greater than about 30 feet,
    wherein the first self-degradable diverting agent interacts with the foaming agent to strengthen the longevity of the treatment fluid in the portion of the subterranean formation, and
    wherein the portion of the subterranean formation has high-contrast permeability such that a low permeability portion of the subterranean formation having a permeability of less than 10 millidarcies abuts a high permeability portion of the subterranean formation having a permeability of greater than 10 millidarcies; and
    degrading the first self-degradable diverting agent within the subterranean formation.

2. The method of claim 1, wherein the foaming agent is selected from the group consisting of: a cationic foaming agent; an anionic foaming agent; an amphoteric foaming agent; a nonionic foaming agent; and any combinations thereof.

3. The method of claim 1, wherein the gas source is selected from the group consisting of: nitrogen; carbon dioxide; air; methane; helium; argon; and any combinations thereof.

4. The method of claim 1, wherein the gas source ranges from a lower limit of about 5% to 70% gas volume to an upper limit of about 95% to 50% by gas volume of the treatment fluid.

5. The method of claim 1, wherein the treatment fluid further comprises an additive selected from the group consisting of: a viscosifying agent; a buffering agent; a pH adjusting agent; a biocide; a bactericide; a friction reducer; a solubilizer; and any combinations thereof.

6. A method of treating a portion of a subterranean formation comprising:
    providing a first treatment fluid comprising a first aqueous base fluid, a first foaming agent, a first gas source, and a first self-degradable diverting agent,
    wherein first foaming agent is present from about 0.01% to about 5.0% of a liquid portion of the first treatment fluid by weight, and second foaming agent is present from about 0.01% to about 5% of a liquid portion of the second treatment fluid by weight,
    wherein the first self-degradable diverting agent is present from about 0.01% to 3% by weight of the first treatment fluid,
    wherein the first self-degradable diverting agent is sized in the range of from about 1 µm to about 1000 µm, and
    wherein the first self-degradable diverting agent is a hydrolytically degradable material selected from the group consisting of a polyethylene glycol; a citrate ester; a glucose monoester; a partially fatty acid ester; a PEG monolaurate; a triacetin; a glycerine-1-benzoate-2,3-dilaurate; a glycerin-2-benzoate-1,3-dilaurate; a bis(butyl diethylene glycol)adipate; an ethylphthalylethyl glycolate; a glycerine diacetate monocaprylate; a diacetyl monoacyl glycol; a polypropylene glycol; a poly(propylene glycol)dibenzoate; a dipropylene glycol dibenzoate; a glycerol; an ethyl phthalyl ethyl glycolate; a poly(ethylene adipate)distearate; a di-isobutyl adipate; any derivatives thereof; and any combinations thereof;

wherein the first self-degradable diverting agent interacts with the first foaming agent to strengthen the longevity of the first treatment fluid in the portion of the subterranean formation;

providing a second treatment fluid comprising a second aqueous base fluid, proppant particulates, a second foaming agent, a second gas source, and a second self-degradable diverting agent, wherein the second self-degradable diverting agent is present from about 0.01% to 3% by weight of the second treatment fluid, and wherein the second self-degradable diverting agent is sized in the range of from about 1 μm to about 1000 μm;

introducing the first treatment fluid into the portion of the subterranean formation at a rate sufficient to create or enhance at least one fracture therein, wherein the portion of the subterranean formation is a long-interval of greater than about 30 feet, and wherein the portion of the subterranean formation has high-contrast permeability such that a low permeability portion of the subterranean formation having a permeability of less than 10 millidarcies abuts a high permeability portion of the subterranean formation having a permeability of greater than 10 millidarcies;

introducing the second treatment fluid into the portion of the subterranean formation at a rate sufficient to propagate the at least one fracture and place the proppant particulates therein; and degrading the first self-degradable diverting agent and the second self-degradable diverting agent within the subterranean formation.

7. The method of claim 6, wherein the first foaming agent and the second foaming agent may be the same or different and are selected from the group consisting of: a cationic foaming agent; an anionic foaming agent; an amphoteric foaming agent; a nonionic foaming agent; and any combinations thereof.

8. The method of claim 6, wherein the first gas source and the second gas source may be the same or different and are selected from the group consisting of: nitrogen; carbon dioxide; air; methane; helium; argon; and any combinations thereof.

9. The method of claim 6, wherein the first gas source and the second gas source may be present in the same or different amounts, wherein the first gas source ranges from a lower limit of about 5% to 70% gas volume to an upper limit of about 95% to 50% by gas volume, and the second gas source ranges from a lower limit of about 5% to 70% gas volume to an upper limit of about 95% to 50% by gas volume.

10. The method of claim 6, wherein the first self-degradable diverting agent and the second self-degradable diverting agent may be the same or different and the second self-degradable diverting agent is selected from the group consisting of a hydrolytically degradable material, a degradable crosslinked gel material, and any combination thereof.

11. The method of claim 10, wherein the hydrolytically degradable material is selected from the group consisting of: a benzoate ester; a phthalate ester; a lactide; a lactone; a glycolide; a lactam; a polysaccharide; a dextran; a cellulose; a chitin; a chitosan; a protein; an aliphatic polyester; a poly(lactide); a poly(glycolide); a poly(ϵ-caprolactone); a poly(hydroxybutyrate); a polyanhydride; an aliphatic polycarbonate; a poly(orthoester); a poly(amide); a poly(urethane); a poly(hydroxyl ester ether); a poly(amino acid); a poly(ethylene oxide); a polyphosphazene; an oligomeric lactic acid; a polyethylene glycol; a polyethylene oxide; a citrate ester; a glucose monoester; a partially fatty acid ester; a PEG monolaurate; a triacetin; a glycerine-1-benzoate-2.3-dilaurate; a glycerin-2-benzoate-1,3-dilaurate; a starch; a bis(butyl diethylene glycol)adipate; an ethylphthalylethyl glycolate; a glycerine diacetate monocaprylate; a diacetyl monoacyl glycol; a polypropylene glycol; a poly(propylene glycol)dibenzoate; a dipropylene glycol dibenzoate; a glycerol; an ethyl phthalyl ethyl glycolate; a poly(ethylene adipate)distearate; a di-iso-butyl adipate, any derivatives thereof, and any combinations thereof.

12. The method of claim 6, wherein the treatment fluid further comprises an additive selected from the group consisting of: a viscosifying agent; a buffering agent; a pH adjusting agent; a biocide; a bactericide; a friction reducer; a solubilizer; and any combinations thereof.

13. The method of claim 1, wherein the aqueous base fluid is selected from the group consisting of produced water, flow back water, and any combination thereof.

* * * * *